United States Patent [19]

Leuschner

[11] Patent Number: 5,509,766
[45] Date of Patent: Apr. 23, 1996

[54] FASTENING APPARATUS

[75] Inventor: Werner Leuschner, Hanover, Germany

[73] Assignee: Nass Magnet GmbH, Hanover, Germany

[21] Appl. No.: 121,262

[22] Filed: Sep. 13, 1993

[30] Foreign Application Priority Data

Jan. 11, 1993 [DE] Germany ............... 43 00 465.2

[51] Int. Cl.⁶ ........................................... F16B 39/282
[52] U.S. Cl. ........................... 411/187; 411/186; 411/908; 411/427
[58] Field of Search ................... 411/6, 7, 187, 411/186, 184, 189, 427, 907, 908, 959, 964

[56] References Cited

U.S. PATENT DOCUMENTS

| | | | |
|---|---|---|---|
| 827,562 | 7/1906 | Pollock | 411/964 |
| 860,393 | 7/1907 | Less | 411/186 |
| 986,510 | 3/1911 | Scott | 411/186 |
| 1,406,423 | 2/1922 | Smith | 411/964 |
| 1,970,525 | 8/1934 | Lyons | 411/964 |
| 3,531,142 | 9/1970 | Peasley | 411/908 |
| 4,715,756 | 12/1987 | Danico | 411/908 |
| 4,764,340 | 8/1988 | Lui | 411/189 |
| 4,820,096 | 4/1989 | Knight | 411/908 |

FOREIGN PATENT DOCUMENTS

| | | | |
|---|---|---|---|
| 727879 | 4/1980 | Russian Federation | 411/427 |
| 777272 | 12/1980 | Russian Federation | 411/184 |

*Primary Examiner*—Flemming Saether
*Attorney, Agent, or Firm*—Learman & McCulloch

[57] ABSTRACT

The invention relates to a fastening system comprising a nut and a counterpart, wherein for protection against torsion of the nut at least two fastening elements are provided which interengage as a projection and a depression. In order on the one hand to secure the nut against inadvertent loosening and on the other hand to facilitate simple manual operation in tightening and loosening, the nut is made from resilient material and is constructed integrally with one of the two fastening elements.

17 Claims, 7 Drawing Sheets

FASTENING APPARATUS

The invention relates to fastening apparatus, comprising a nut and a counterpart, two fastening elements are provided which interengage as a projection and a depression.

BACKGROUND OF THE INVENTION

Known fastening apparatus has a metal nut having a plastic cap with a detent. As protection against unintended rotation of the nut this detent engages in one of several depressions in the counterpart. During tightening, the spring-mounted detent springs from one depression to the other. The tightened nut is secured to a sufficient extent against inadvertent loosening, for example due to vibrations, by the detent engaging in a depression. However, if the nut is intended to be loosened, then this is only possible with the application of great force or with the aid of a tool with which the detent is "levered" out of the depression.

It is also known in the art to use so-called spring plates as protection against nut rotation. However, in the case of strong vibrations, such as occur frequently for example in machines in the automation sector, a spring plate is not sufficient to prevent inadvertent loosening of the fastening nut.

The object of the invention, therefore, is to improve the known fastening devices in such a way that on the one hand sufficient protection against undesired loosening of the nut is ensured and on the other hand the nut can be tightened and loosened in a simple manner.

SUMMARY OF THE INVENTION

Fastening apparatus according to the invention comprises a nut member rotatable about an axis and adapted to bear against a counterpart member. Each of the members has a fastening element and such fastening elements cooperate with one another to prevent unwanted relative rotation of the members, but enable such relative rotation when desired. The nut is made from flexible, resilient material and its flexibility is increased by the fact that it is constructed from resilient material and is integral with one of the two fastening elements, so that tightening and loosening of the nut is made possible in a simple manner. On the other hand, the interengaging fastening elements ensure a sufficient protection against undesired loosening of the nut.

THE DRAWINGS

FIG. 1 shows a sectional representation along the line III—III in FIG. 3 of the nut according to a first embodiment, FIG. 2 shows a view from below of the nut according to the first embodiment, FIG. 3 shows a view from above of the nut according to the first embodiment, FIG. 4 shows a view from above of the counterpart, FIG. 5 shows a cut-away view of a detail of the fastening elements according to the first embodiment, FIG. 6 shows a sectional representation of the nut according to a second embodiment, FIG. 7 shows a sectional representation along the line VI-VI in FIG. 6, FIG. 8 shows a cut-away view of a detail of the second embodiment and FIG. 9 shows a partially cut-away representation of the fastening system of a coil in a solenoid valve.

DETAILED DESCRIPTION

Figure 1:
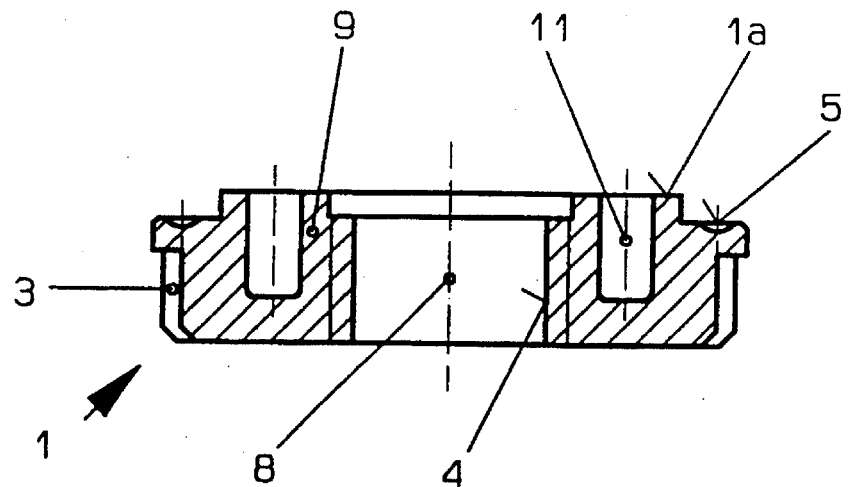
Figure 2:
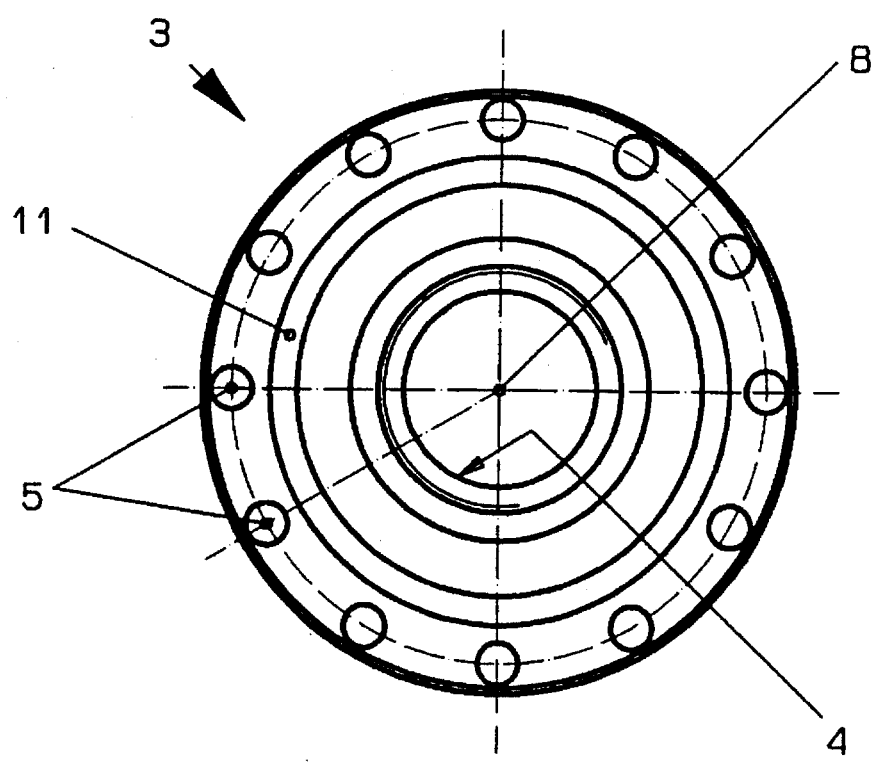
Figure 3:
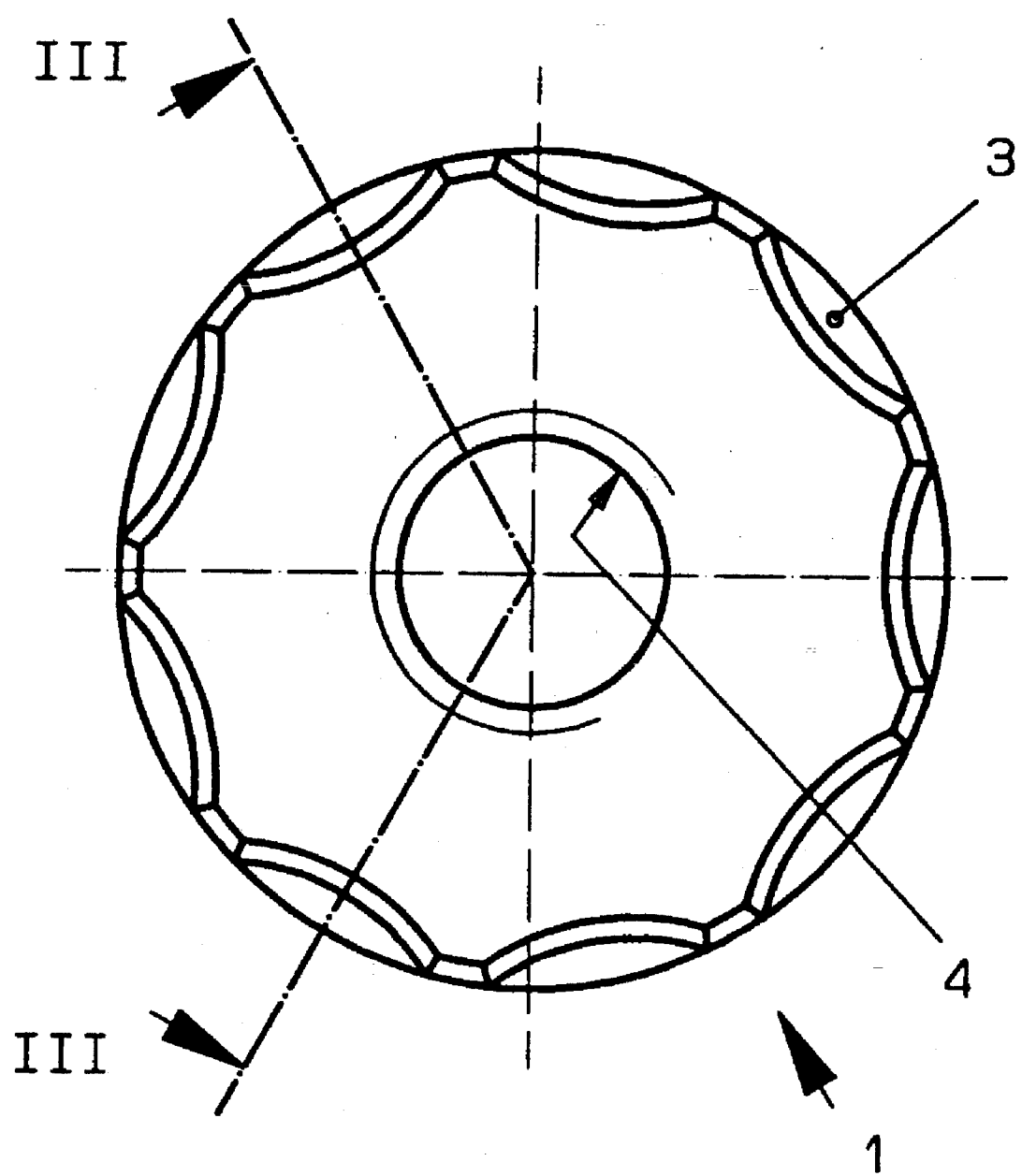

A first embodiment of a fastening system is described first of all in FIGS. 1 to 5. It comprises a nut 1 shown in FIGS. 1 to 3 and a counterpart 2 shown in FIG. 4. The nut 1 is constructed as a knurled nut and for this purpose has a knurling 3 on its radially outer circumferential surface. The nut 1 also has a through bore 4 provided with an internal thread.

On the end face 1a of the nut 1 which comes into contact with the counterpart 2 a plurality of fastening elements are provided which are integral with the or confronts nut 1. The fastening elements are formed by depressions 5 in the present embodiment.

Figure 4:
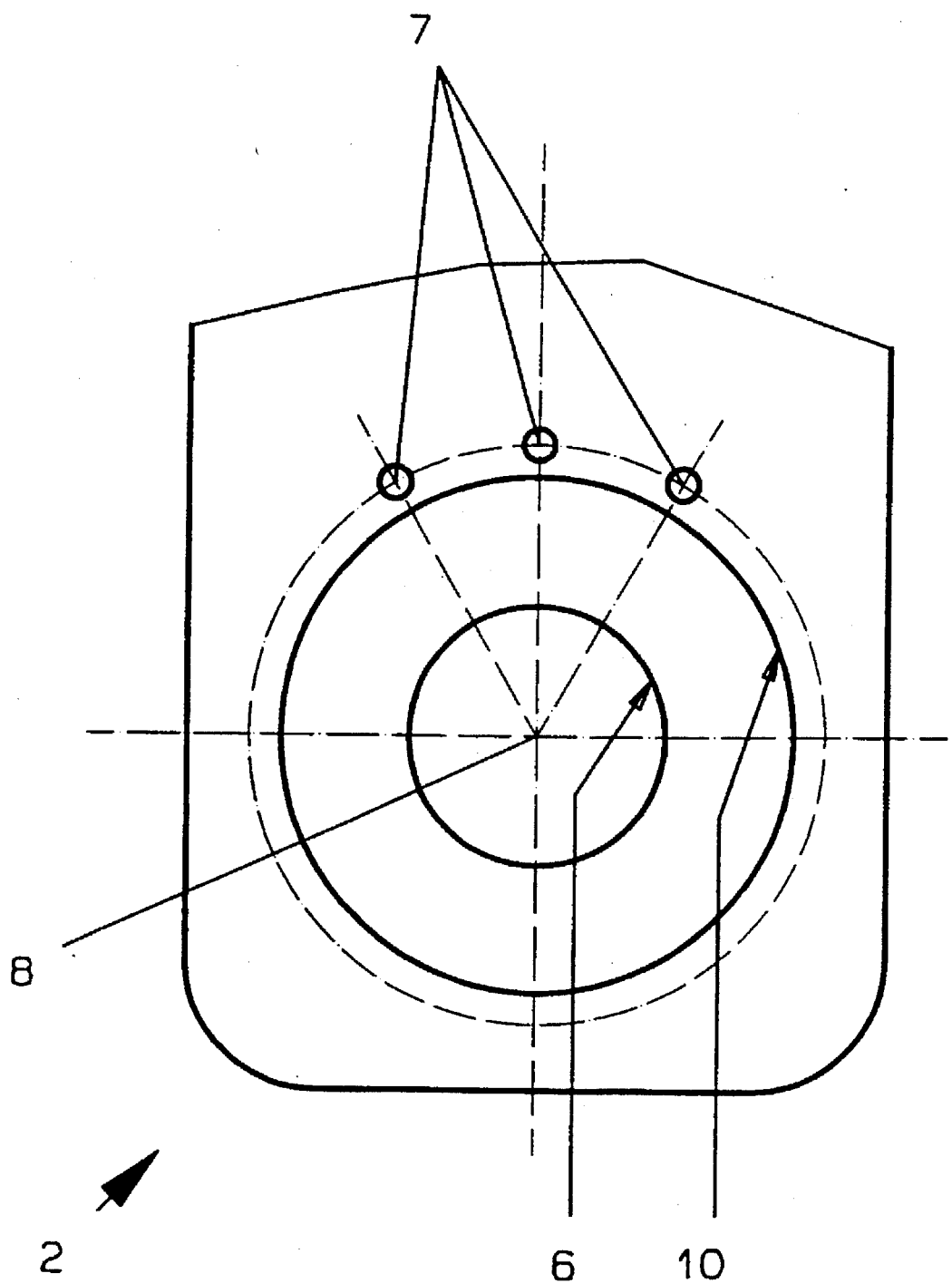

The counterpart 2 shown in FIG. 4 can, for example, constitute a fastening plate, a housing part or a part of an arrangement to be connected to another part. This counterpart 2 also has a through bore 6 through which a part (not shown) which is provided with an external thread can be pushed in order then to come into screwed engagement with the nut 1. Consequently the central axis of the through bore 6 simultaneously forms the central axis of the through bore 4 and thus the axis of rotation 8 of the nut 1.

On that surface of the counterpart 2 which confronts the nut are projections constituting fastening elements wdhich are appropriately constructed as bosses of matching shape to the depression 5. These bosses 7 are advantageously integral with the counterpart 2. In the tightened state of the nut 1 the bosses 7 engage in the depressions 5 and in this way secure the nut against inadvertent turning or loosening, see FIG. 5.

The bosses 7 are convex and have surfaces formed as a spherical segment, whilst the depressions 5 are of appropriately matching shape. The depressions 5 are arranged in a ring on the nut 1 in the radially outer region of the end face 1a and are equally spaced about the axis of rotation 8. The bosses 7 are correspondingly arranged with the same spacing from the axis of rotation 8 on the counterpart 2.

Figure 5:
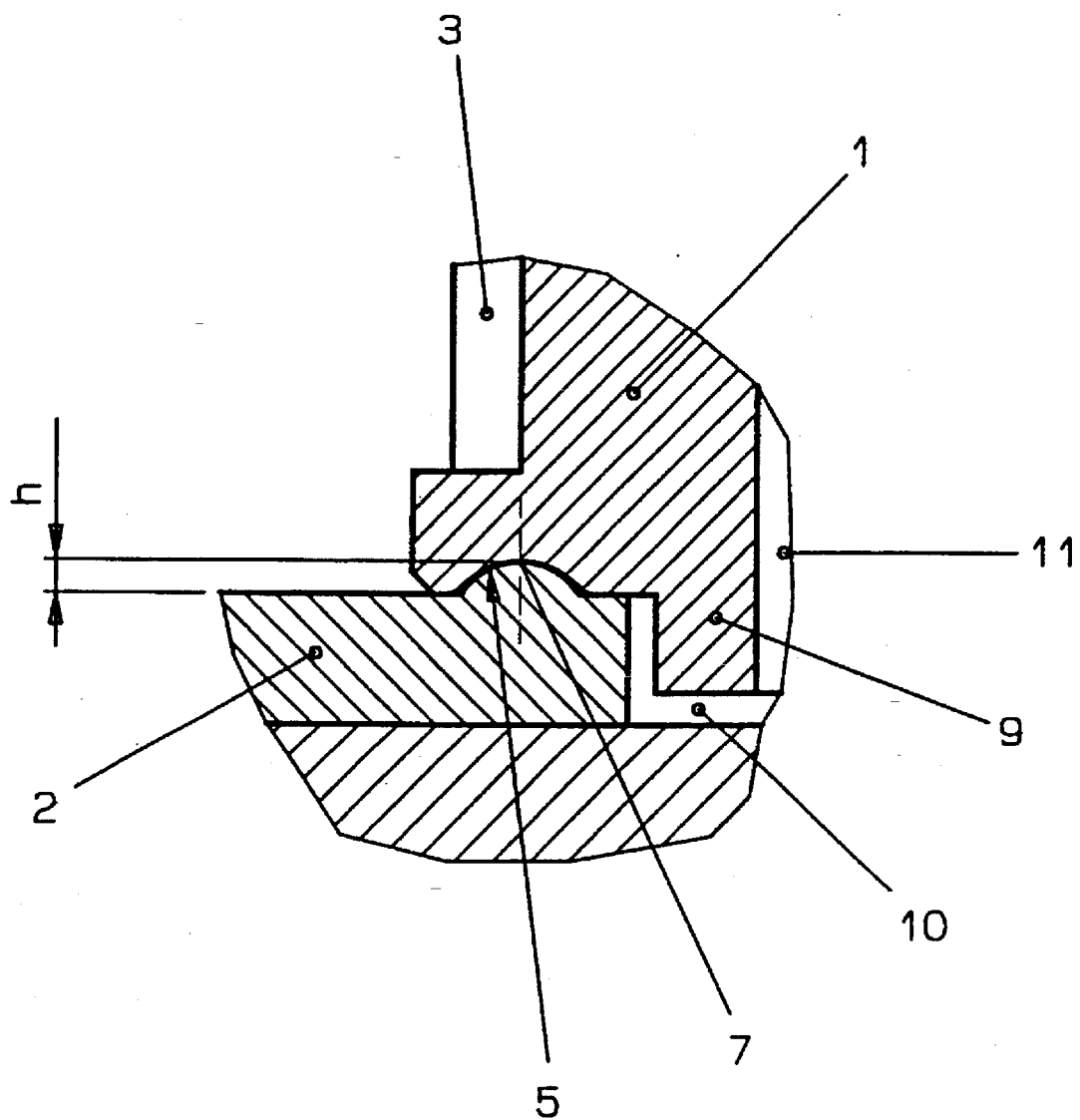

It can be seen from FIGS. 1 and 5 that the end face 1a which comes into contact with the counterpart 2 is not of flat construction but has a shoulder 9 which co-operates with a channel 10 in the counterpart 2. Essentially the shoulder 9 and the channel 10 effect an adjustment of the nut 1 on the counterpart 2 so that the bosses 7 can come into engagement with the depressions 5. However, in this respect other constructions of the nut and of the counterpart are also conceivable.

Whereas a number of depressions 5 are to be arranged equally spaced in a ring on the nut 1, it is sufficient on the counterpart to provide at least one boss 7. In the present embodiment three of them are provided. Naturally, within the scope of the invention the number of bosses 7 can correspond to the number of depressions 5. In order to make it possible for the nut 1 to rest neatly on the counterpart 2 in the tightened state, however, the spacing of the bosses 7 both with respect to one another and also with respect to the axis of rotation 8 should correspond to the spacing of the depressions 5 on the nut.

The height h (see FIG. 5) of the bosses 7 is such that when the nut 1 is tightened the bosses only come into engagement with the depressions 5 shortly before the final torque is reached. In the last stage of tightening of the nut 1 the bosses 7 slip from one depression 5 into the next. The rounded shape of the bosses makes it possible to tighten the nut 1 by hand even at this stage. In order to make this slipping of the bosses 7 from one depression 5 into the next possible, the nut 1 should be made from resilient flexible material, such as for example thermoplastic material. The flexibility of such materials makes it possible, particularly in the region of the radially outer depressions 5, for the nut 1 to be raised with respect to the counterpart 2 when the bosses are located just between two depressions 5.

In the tightened state of the nut 1 all the bosses 7 are each located in a depression 5. In this state the nut is reliably protected against inadvertent turning or loosening, even in the event of strong vibrations.

In order further to increase the flexibility of the nut 1, particularly in the region of the depressions 5, at least one groove can be provided. The embodiment according to FIGS. 1 to 5 has a circular, endless groove 11 which runs concentrically about the axis of rotation 8 and opens in the end face 1a of the nut 1 which comes into contact with the counterpart 2. In this case the depth of the nut should be chosen according to the desired increase in the flexibility, in which case the stability of the nut 1 should be taken into account. The groove 11 isolates a resiliently flexible spring portion of the nut 1 along the depth of the groove in the region between the groove and the radially outer surface of the nut 1. The depressions 7 are located on the spring portion (the region numbered "1" in FIG. 5) to enable the depressions 7 to flex resiliently with the spring portion into and out of locking engagement with the projections 5 as the nut 1 is rotated into tightened engagement with the counterpart 2.

Figure 6:
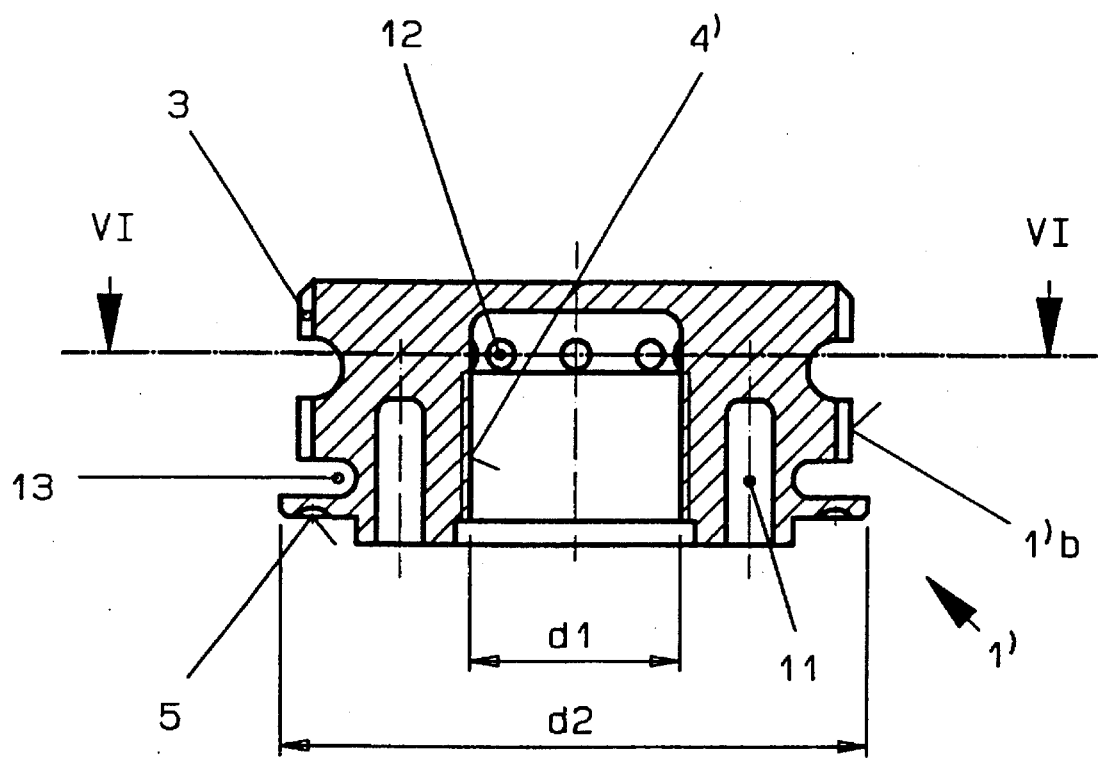
Figure 7:
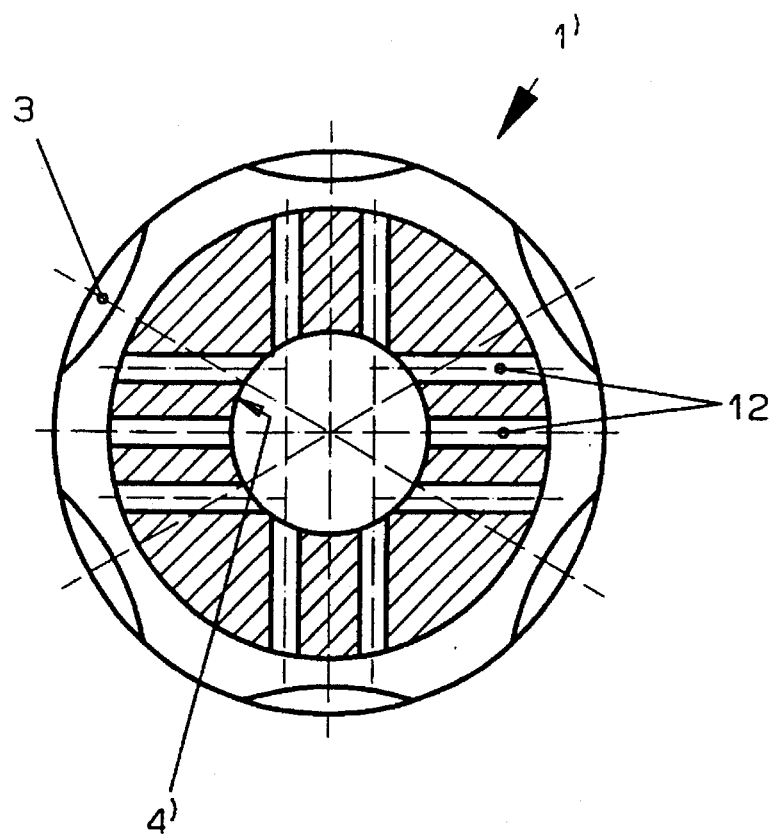

A second embodiment of a fastening system is illustrated in FIGS. 6 and 7, in which the differences relative to the first embodiment only occur in the nut. To aid understanding the same parts are given the same reference numerals as in the first embodiment.

In contrast to the nut 1 described in the first embodiment, the nut 1' of the second embodiment has transverse holes or passages 12. These transverse holes serve for ventilation, particularly when the system is used with solenoid valves. These transverse holes 12 should be provided when no through bore 4 as in the first embodiment is used, but rather a blind bore 4'.

Figure 8:
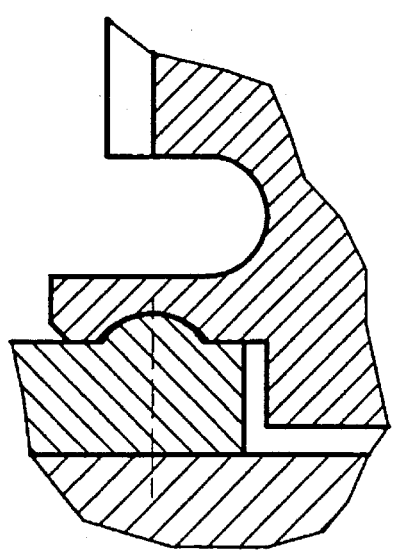

However, the presence of the transverse holes 12 restricts the depth of the groove 11. If the available depth of the groove 11 is not sufficient to provide the necessary flexibility in the region of the depressions 5, then a further groove 13 can be provided. As can be seen from FIG. 6, the groove 13 is arranged a relatively small distance above the depressions 5 in the radial circumferential surface 1b and extends radially inward therefrom. This additional groove 13 makes it possible to compensate for the loss of flexibility due to the reduced depth of the groove. Within the scope of the invention only the groove 13 can be provided instead of the groove 11. As is shown in FIGS. 6 and 8 the groove 13 also isolates a spring portion of the nut along its depth and in the region below the groove 13 (i.e., between the groove 13 and the lower end face of the nut 1'). The groove 13, either alone or in combination with groove 11, provides the nut with the resilient flexibility that enables the depressions 7 to ratchet into and out of engagement with the projections 5 as the nut is tightened against the counterpart 2.

In the two embodiments described above the depressions 5 are constructed integrally with the nut, whilst the bosses 7 are provided on the counterpart 2. However, it is also conceivable within the scope of the invention for the bosses to be constructed on the nut and the depressions on the counterpart. However, in this case it is advantageous for the same number of both depressions and bosses to be arranged in a ring with the same spacing in order to avoid tilting of the nut.

Figure 9:
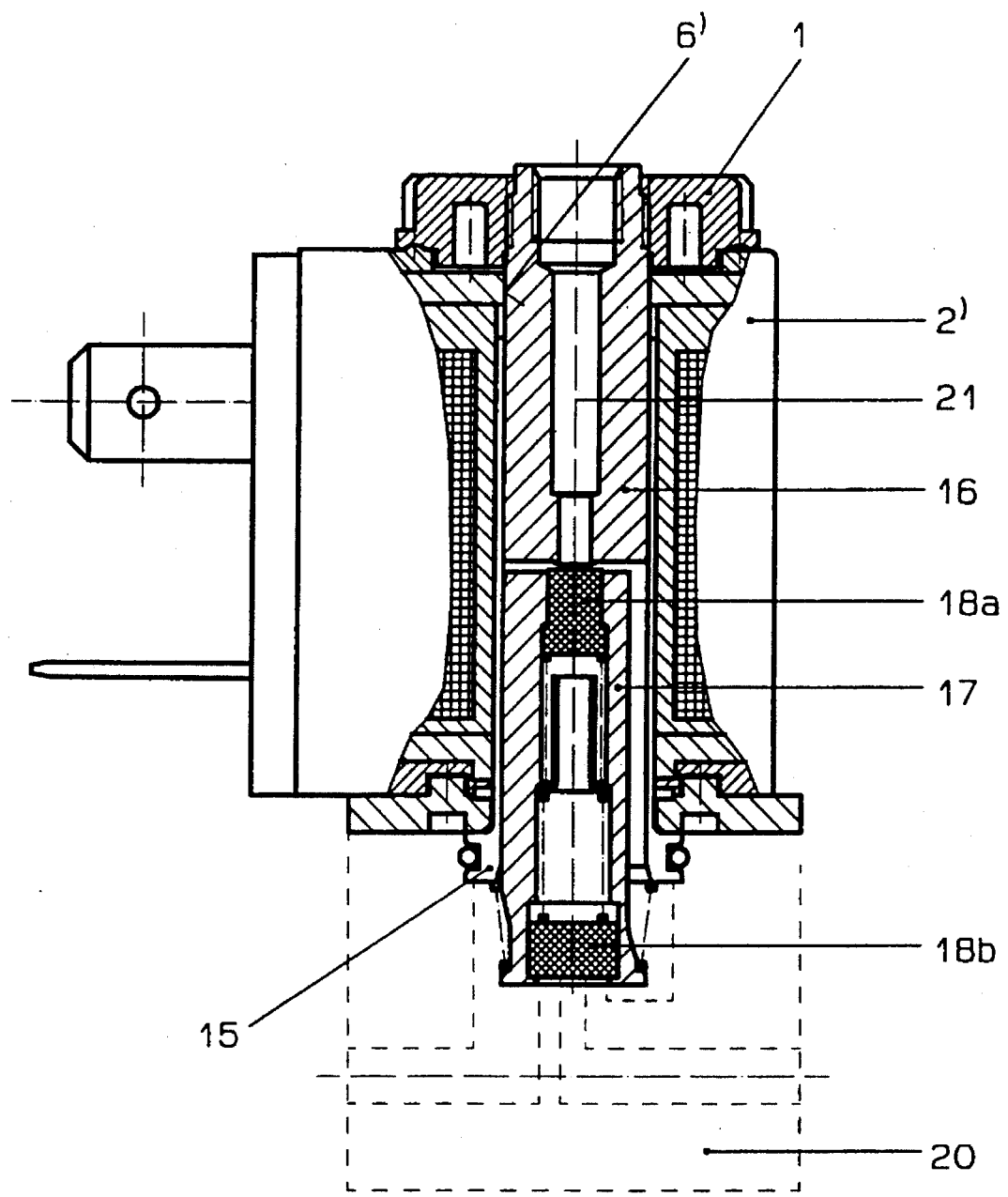

A fastening system for a coil in a solenoid valve is described in FIG. 9. In this case the counterpart is formed by a coil 2'. An armature guide 15 with a magnet core 16 and an armature 17 is introduced into the through bore 6' of the coil 2' and is fixed with the nut 1 on the coil 2'. The movable armature 17 has sealing inserts 18a, 18b on both ends. The sealing insert 18a of the armature 17 which comes into connection with a valve seat on the magnet core 16 serves for opening or closing the ventilation duct 21 which, passes through the nut 1. The opposing sealing insert 18b cooperates with a valve seat in a valve housing 20 which is shown by a broken line. Different valve settings can be achieved depending upon the position of the armature The interengagement of the depressions and bosses of the fastening nut 1 takes place in the same way as in the first and second embodiments. Depending upon the requirements, in the embodiment shown in FIG. 9 both the nut 1 according to the first embodiment and the nut 1' according to the second embodiment can be used.

In all the illustrated cases it is a significant that the nut 1 is so flexible in the region of the depressions 5 that tightening of the nut by hand is possible. For this purpose it is advantageous to fix the height h of the bosses 7 on the counterpart so that it is approximately 1 to 10 percent of half the difference between the diameter of the nut $d_2$ and the bore $d_1$, preferably 5 percent of half the difference (see FIG. 6). If it is assumed, for example, that the diameter $d_2$ of the nut 1, 1' is 20 mm and the diameter $d_1$ of the through bore 4, 4' is approximately 8 mm, then the following is produced for the height h:

$$h = (20 \text{ mm} - 8 \text{ mm})/2 * 5\% = 0.3 \text{ mm}$$

The radius of the sphere forming the shape of the boss 7 should be chosen to be markedly greater than the height of the projection. With a height of 0.3 mm the radius could be approximately 1.5 mm. In this way relatively flat rounded bosses are produced which allow actuation of the nut by hand even in the last stage of tightening of the nut.

However, the details given above for dimensions of the bosses only constitute guidelines. In order to achieve the necessary flexibility of the nut in the region of the depressions, not only the construction of the projections but above all the dimensions of the grooves and the production material used for the nut play a great part, so that adaptation is necessary to the type of use.

It can be particularly advantageous to give the depression a greater radius than the boss. This produces a flat inlet or outlet angle, so that the nut slides better over the bosses.

I claim:

1. Fastening apparatus comprising a nut member rotatable about an axis, and a counterpart member, said nut member having a bore and said members having confronting surfaces, one of said members having a fastening element comprising at least one projection and the other of said members having a fastening element comprising at least one depression in which said projection removably may be accommodated, said nut member being formed of resilient, flexible material and having at least one groove therein adjacent its associated fastening element to increase the flexibility of said nut member adjacent its associated fastening element, said groove being in that surface of said nut member which confronts the surface of said counterpart member.

2. Apparatus according to claim 1 wherein the projection and the depression are substantially equally radially spaced from said axis.

3. Apparatus according to claim 1 including a plurality of said projections and a plurality of said depressions, said projections and said depressions being substantially equally radially spaced from said axis.

4. Apparatus according to claim 1 wherein each of said projections and said depressions has a corresponding spherical surface.

5. The apparatus according to claim 1 wherein said nut member has a marginal edge and including another groove extending radially inward from said edge.

6. The apparatus according to claim 1 wherein said projection has a spherical, convex surface.

7. The apparatus according the claim 6 wherein said convex surface is formed on a radius greater than the height that said projection projects beyond the surface of its associated fastening element.

8. The apparatus according to claim 7 wherein the height of said projection projects beyond said surface between 1 and 10 percent of ½ of difference between the diameters of said nut member and said bore.

9. The apparatus according to claim 1 wherein said nut member is knurled.

10. The apparatus according to claim 1 including a solenoid coil and wherein said counterpart comprises one end of said solenoid coil.

11. The apparatus according to claim 1 wherein said groove is endless.

12. The apparatus according to claim 11 including a plurality of said depressions uniformly spaced apart in a ring, said ring and said groove being concentric.

13. The apparatus according to claim 12 wherein said groove is radially inward of said ring.

14. The apparatus according to claim 1 wherein said bore is open at each end thereof.

15. The apparatus according to claim 1 wherein said bore is closed at one end thereof.

16. The apparatus according to claim 15 wherein said nut member has at least one ventilating passage therein.

17. The apparatus according to claim 16 wherein said passage communicates radially with said bore adjacent its closed end.

* * * * *